Dec. 20, 1960 R. F. O'MARA ET AL 2,965,366
KILN PROCESS HAVING INCREASED THERMAL EFFICIENCY
Filed Aug. 9, 1957 3 Sheets-Sheet 2
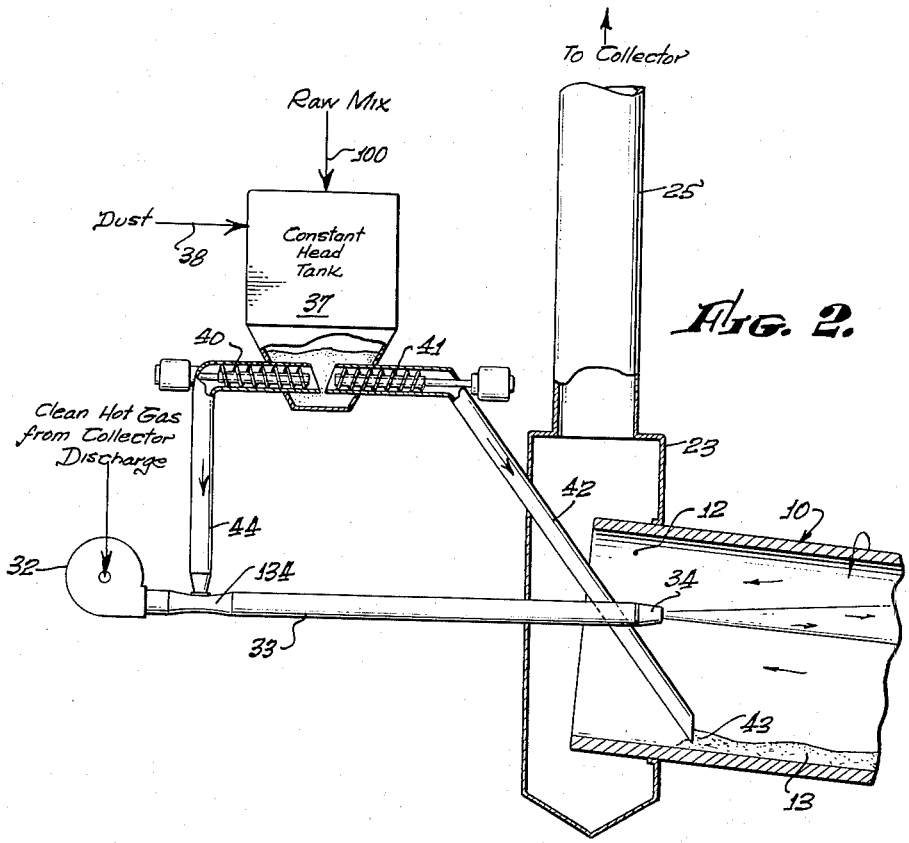
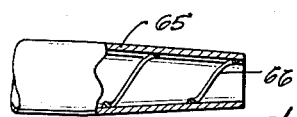
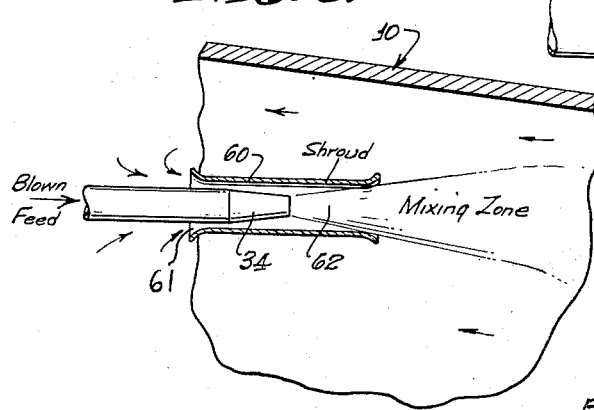
INVENTORS.
RICHARD F. O'MARA,
ROBERT G. PATTERSON,
By Healey White
ATTORNEY.

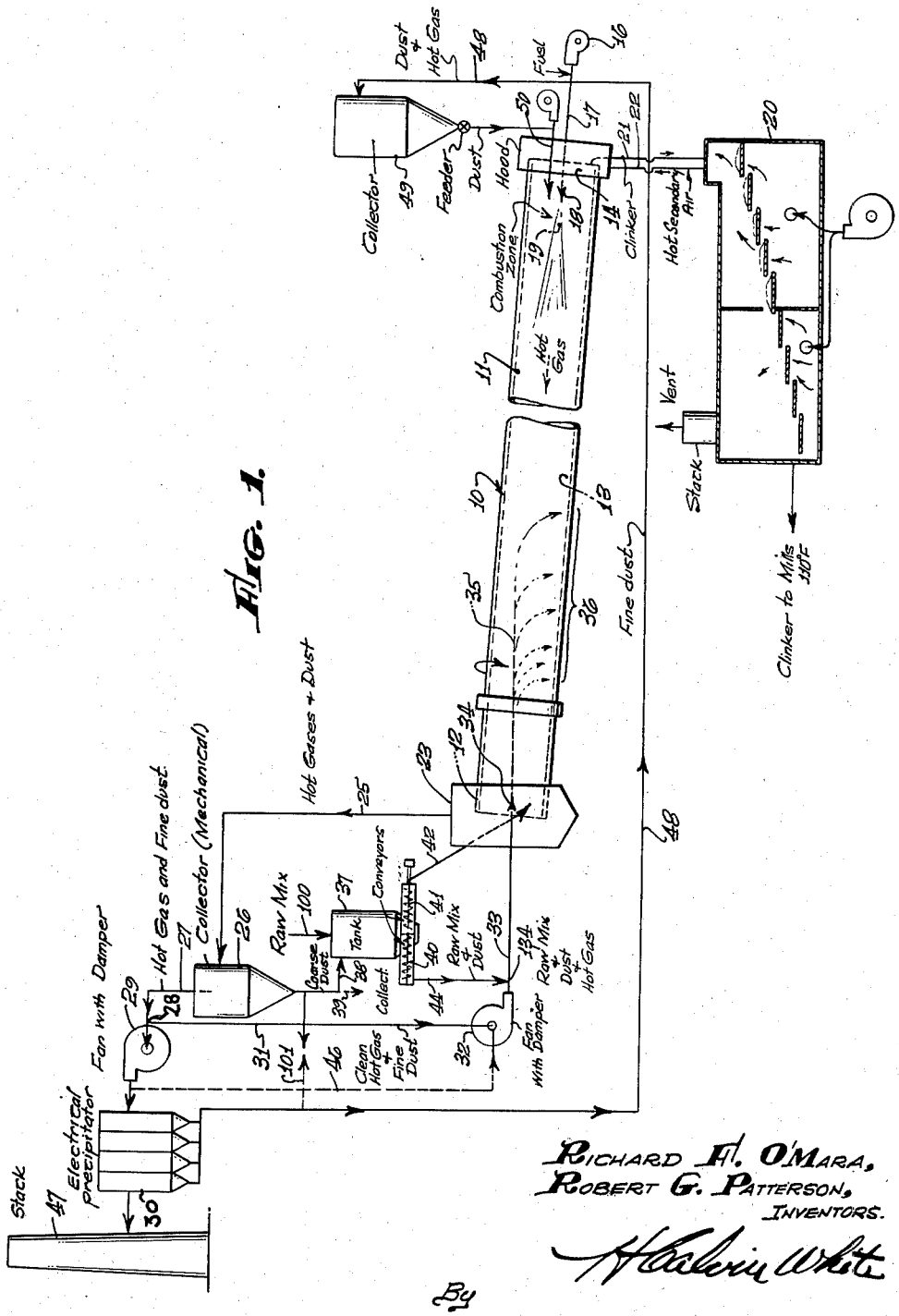

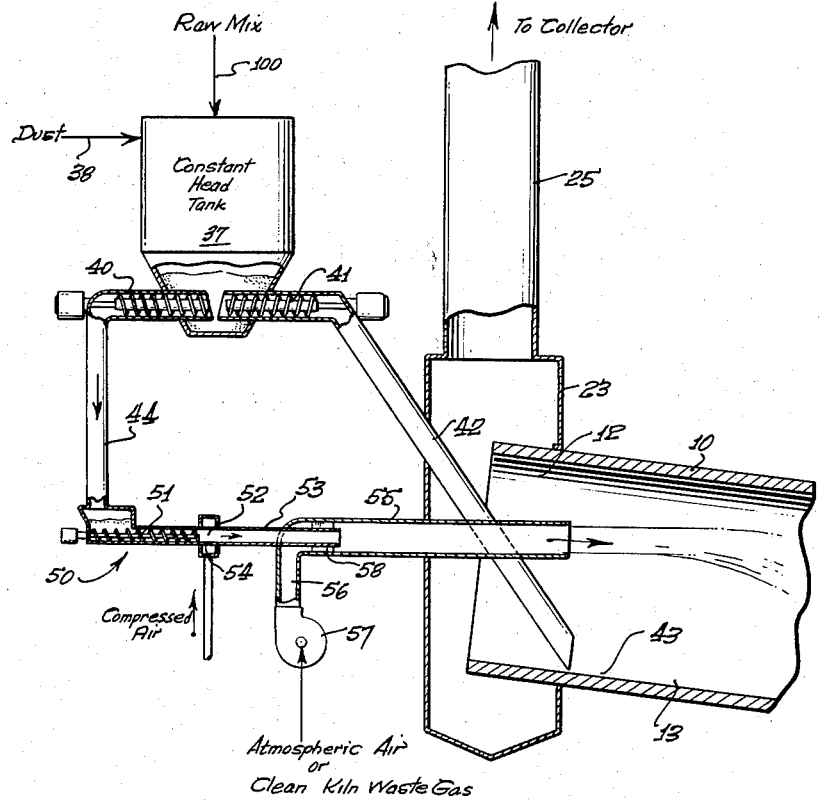
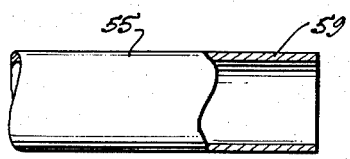

United States Patent Office 2,965,366
Patented Dec. 20, 1960

2,965,366

KILN PROCESS HAVING INCREASED THERMAL EFFICIENCY

Richard F. O'Mara, 839 S. Lorraine Blvd., Los Angeles, Calif., and Robert G. Patterson, 301 S. Fonda St., La Habra, Calif.

Filed Aug. 9, 1957, Ser. No. 677,277

20 Claims. (Cl. 263—32)

This invention relates generally to unit process operations in which rock containing materials are converted into clinker, and more particularly has to do with a novel process and means for producing Portland cement clinker whereby the economy of the process, as respects the quantity of clinker forming heat energy required per barrel of resultant cement, is substantially improved.

Speaking generally with regard to the production of cement clinker, it is common practice to feed what is known as the raw mixture or raw materials into a rotary kiln, as by mechanically conveying the feed to the kiln, in which the materials are burned into clinker by very hot gases flowing downstream in the kiln, the materials normally being traveled upstream relative to the gases, i.e. downhill, in the slightly inclined from horizontal kiln during the course of conversion into clinker. Prior to their being fed to the kiln, the calcareous raw materials which consist essentially of limestone, shale, oyster shells, clay, marl, iron ore and silica sand, are crushed and ground, either by the wet or dry processes as indicated in the Chemical and Metallurgical Engineering Process Industries Data Book, published by "Chemical and Metallurgical Engineering"; and the clinker formed by treatment of the materials in the kiln is pulverized, blended with gypsum and finally stored or shipped as cement.

The normal effluence from the kiln consists of hot kiln gases, at temperatures ranging from 400 to 1600 degrees F., in which are entrained dust particles picked up from the raw mix and clinker in the kiln. Both the heat content of the gaseous effluence and the dust entrained therein are of value economically, and in the past various heat and dust recovery systems and methods such as waste heat boilers, raw feed nodule heating by exhaust gases, dust collectors and precipitators have been incorporated in cement plants, all these prior methods being characterized by heat recovery from the gases external to the kiln. Among the purposes of the present invention are the provision of a cement clinker producing process and means wherein substantial savings in the amount of heat and fuel required to produce a given quantity of clinker may be realized through recovery of heat from the hot kiln gas directly within the kiln where the gas temperature is at its highest level.

In carrying out the invention, calcareous materials to be burned into clinker are entrained in a side stream of gas, and the gaseous side stream and entrainment are discharged into a downstream zone in the kiln and preferably dispersed into the hot kiln gas and countercurrent to its flow, so that the falling entrainment is subjected to intense heating during its intimate contact with hot kiln gas slowing down the countercurrent discharge. The gaseous side stream used to convey the calcareous materials, typically dust, to the kiln may comprise the gaseous effluent from the kiln, preferably from which dust has been removed as by mechanical collection, a separate gas stream heated by that effluence as in a heat exchanger, or an unheated separate stream; and the calcareous materials entrained in the stream may comprise all or a part of the total raw mixture fed to the kiln or the recovered dust, or both in variable quantities, it being contemplated that the relative proportions of all of the calcareous materials introduced into the kiln by entrainment in a gas stream and by other means be adjusted to reduce the amount of heat and gas volume required to produce a given quantity of clinker, with the process thermal efficiency being increased. Thus, the rate of entrainment discharge may be so related to the rate of feeding of non-entrained raw mix to the kiln as to reduce the amount of heat energy required to produce a given quantity of clinker below the amount of heat energy required to produce the same quantity of clinker in the absence of entrainment discharge into the kiln, and ultimately to minimize the heat energy required.

That a heat saving is realized is shown by the fact that the entrainment is preferably ejected into the kiln to fall therein relatively upstream in the direction of the source of the hot kiln gases. Entrainment so preheated by the hot kiln gas requires a shorter residence time in the kiln for production of clinker therefrom. A particularly advantageous effect of re-introducing recovered dust into the kiln in the form of dispersed entrainment consists in the tendency of the alkaline content of the dust to be volatilized by intimate contact with the hot countercurrent kiln gas, thereby preventing undesirable increase in the clinker alkalinity.

An additional step of the process comprises introducing the finer dust electrically precipitated from the gaseous effluence from the kiln directly into the upstream fuel combustion zone in the kiln, wherein the dust alkalies are volatilized and the remainder is burned into clinker form. Here again, the rates of delivery of the calcareous materials into the kiln, including mechanically collected and electrically precipitated dust variously delivered to the kiln as by entrainment discharge, non-entrained raw mix feed and dust introduction into the combustion zone may be so proportioned as to achieve maximum economy in a particular cement kiln design.

While the above objects of the invention have been discussed with reference to cement clinker production, it will be understood that the same principles are applicable to the formation of calcined materials or clinker from rock containing materials in general, and particularly in the non-ferrous metallurgical industries.

These and other features and objects of the invention, as well as the details of an illustrative embodiment will be more fully understood from the following detailed description of the drawings, in which:

Fig. 1 is a flow diagram illustrating the steps of the overall process;

Fig. 2 is an enlarged elevation taken in section showing the means for discharging a stream of hot gas and entrainment upstream into the kiln;

Fig. 3 is a further enlarged section showing the entrainment discharge nozzle in the kiln and means for inducing further mixing of hot kiln gas with the discharged entrainment:

Fig. 4 is a section taken through a modified entrainment discharge nozzle;

Fig. 5 is an enlarged elevation similar to Fig. 2 showing alternate means for discharging a stream of gas and entrainment upstream into the kiln; and Fig. 6 is a section taken through another modified entrainment discharge nozzle.

In Fig. 1, the elongated rotary kiln 10 is axially inclined slightly from the horizontal so that hot kiln gas 11 flows downstream toward the gas outlet end portion 12 of the kiln and calcareous materials 13 in the kiln flow downhill toward the gas inlet end portion 14 thereof.

Typically, fuel such as natural gas, oil or pulverized coal is fed at 15 in proper quantities with or without primary air from fan 16 through line 17 passing through the hooded inlet end of the kiln to a burner indicated at 18, and the fuel is combusted at 19 with addition of hot secondary air introduced to the kiln hood from a clinker cooler 20 typically of the air quenching type. The moving grates of such a cooler travel the hot clinker while passing secondary air in heat receiving relation with the clinker, as shown in Fig. 1.

The hot kiln gases 11 pass downstream in the kiln at elevated temperature progressively burning the calcareous materials into clinker, which is discharged from the kiln at 21 and passed through the cooler 20 for ultimate grinding. Hot air from the cooler may be conducted at 22 to the kiln hood for introduction to the kiln combustion zone 18.

The hot gases flow from the kiln end 12 into a housing 23, from which they are then conducted at 25 to a mechanical dust collector 26 shown in the form of a cyclone type collector, the quantity of dust normally carried by the effluent gases ranging from 2 to 50 grains per cubic foot of gas.

Relatively clean effluent gas discharged at 27 from the collector 26 is then if desired separated at 28 into two streams, one being conducted to the inlet of a fan 29 delivering to an electrical dust precipitator 30, and the other gas stream being conducted at 31 to the inlet of another fan 32. The latter delivers the second hot stream of gas to a conduit 33 terminating in a materials dispensing nozzle 34 directed upstream in the outlet end portion 12 of the kiln. Both fans are provided with dampers for controlling the relative proportions of the hot effluent gas delivered to and blown by the respective fans, in accordance with the principles of heat economy taught by the present invention.

The hot gaseous stream in conduit 33 at a temperature between 450 and 950 degrees F. entrains and preheats calcareous materials delivered to the venturi shaped conduit section 134, as better shown in Figure 2, for transporting the entrainment to the nozzle 34, the hot gas stream and entrainment being dispersed upstream into the hotter-kiln gases and countercurrent thereto at a nozzle velocity between 50 and 200 feet per second. The discharged entrainment follows a trajectory indicated at 35 and modified by the countercurrent flow of hotter kiln gases, so that prior to its collection in the kiln in the zone 36 the entrainment is intimately mixed with and contacted by the high temperature kiln gases for more rapid conversion into clinker. Considering the possible physical compositions of entrainment as will be brought out, and the range of nozzle velocities thereof, between 0.25 and 1.00 cubic foot of hot gas per pound of entrainment should be passed through the conduit 33, the venturi section 34 of the conduit being designed to meet these requirements.

Shown at 37 in Figs. 1 and 2 is a storage tank or receptacle for receiving and maintaining calcareous materials at a constant head, the materials consisting of the raw mixture (from the wet or dry process) delivered at 100 to the tank, and dust separated in the collectors 26 and 30 from the kiln gas effluence and introduced at 38 into the tank 37. As an alternative, the dust may not be introduced into the tank, but passed at 39 to another collector for other use.

The calcareous materials in the lower portion of the tank 37 are withdrawn therefrom by a pair of adjustable speed, motor driven conveyors 40 and 41, the latter delivering withdrawn materials to a chute 42 passing downward into the kiln end housing 23 and terminating within the kiln end portion 12 to feed or deposit the materials in a layer at 43 upon the inside of the rotating kiln. These materials are thereafter traveled at a slow rate along the length of the kiln by rotation thereof to be burned into clinker.

Conveyor 40 delivers materials withdrawn from the tank 37 to a conduit 44 terminating at the venturi section 134 of conduit 33 for materials entrainment by the gaseous side stream therein and subsequent discharge of the entrainment into the kiln gas as described above. Since the speeds of the conveyors are adjustable, the respective rates of discharge of entrainment into the kiln gas and of raw materials deposition upon the kiln inside may be varied to achieve maximum economy as respects the amount of heat required per given quantity of clinker produced.

The invention also contemplates conducting a portion of the clean hot gas discharged from fan 29 through conduit 46 to the fan 32, instead of through line 31. Gas ultimately delivered to the precipitator is therein cleaned of fine dust particles, and passed to the stack 47.

The precipitated fine dust may be used to form clinker in the kiln by returning it to tank 37 via lines 101 and 38 in accordance with the flow diagram of Fig. 1, or this dust may be conducted through a conduit 48 to a collector 49 near the kiln entrance end 14. Coarser dust recovered in collector 26 may also be diverted at 101 to conduit 48 for optimum clinker production. The dust segregated in collector 49 is typically fed through a separate conduit 50 into the kiln upstream end, where the alkali content of the dust is volatilized, as for example in the combustion zone 19, and the remainder of the dust converted directly into clinker. Alternatively, the dust may be fed through fuel line 17 to the combustion zone 19.

In Fig. 3 is shown a tubular shroud 60 extending concentrically about the nozzle and having flared opposite ends for leading hot kiln gas into the shroud open end 61 for increased mixing with the ejected entrainment at 62. The kiln gas is induced into the shroud by lower pressure existent therein resulting from the high speed gas and entrainment discharge, and increased mixing of entrainment with hot kiln gas within the shroud tends to enhance clinker formation.

The tapered nozzle 65 shown in Fig. 4 is internally rifled at 66 to impart a swirling motion to the ejected stream of gas and entrainment for increased mixing with the hot gas in the kiln, nozzle 65 being usable in replacement of nozzle 34 shown in Figs. 1 and 2.

It is contemplated that on an overall basis the amount of heat energy required in the production of a barrel of cement according to the present process will be reduced 10 to 40 percent depending upon the design and capacity of the kiln in which clinker is produced. Since roughly 1,000,000 B.t.u. of heat energy is normally required per barrel of cement produced, it is evident that substantial savings in heat energy and cost of cement production will be realized in those plants where the present process is installed.

The alternate method and apparatus for discharging the gaseous side stream and entrained calcareous materials into the hot kiln gas, as shown in Fig. 5, includes the storage tank 37 and feed screws 40 and 41 previously described, together with a Fuller type conveyor arrangement indicated at 50. The latter comprises a feed screw 51 receiving calcareous materials from line 44, and delivering them into a zone 52 in conduit 53 receiving compressed air through jet orifices 54 in the conduit.

Suitable aeration of the materials causes them to flow, typically at rates of 20 to 25 feet per second, with approximately .02 to .04 pound of air per pound of materials being required. The materials entrainment is then delivered through conduit 53 into a larger pipe 55, where the entrainment is mixed with a much higher velocity side stream 56 of air flowing in concurrent relation with the materials, and typically raising the materials to air ratio up to the range one-quarter to one cubic foot of air per pound of material. The side stream 56 is delivered by blower fan 57 and may comprise atmospheric air or clean waste kiln gas. Suitable straightening vanes 58 may be located around the nozzle end of conduit 53 to straighten the side stream flow and reduce abrasive wear conditions resulting from the high velocity of entrainment flow in pipe 54.

Abrasive wear of pipe 55 is minimized when the nozzle end thereof, as better shown at 59 in Fig. 6, comprises a straight tube through which the entrainment flow may pass without obstruction.

We claim:

1. In the process wherein rock containing calcareous materials are calcined and formed into clinker by treatment with hot gas flowing downstream in a kiln, said materials including raw mix that has not been previously kiln treated, the steps that include continuously feeding some of said materials into a downstream zone in the kiln, conveying additional of said materials including said raw mix in a side stream of gas, and discharging said gaseous side stream and conveyed materials into the kiln so that the discharged materials travel in an elongated upstream trajectory terminating at an upstream zone in the kiln whereby the discharged materials absorb and thereby recover heat from said hot kiln gas.

2. In the process wherein essentially dry rock containing materials are calcined and formed into clinker by treatment with hot gas flowing downstream in a kiln, said materials including raw mix that has not been previously kiln treated, the steps that include continuously dumping some of said materials in a downstream zone in the kiln, entraining additional of said materials including said raw mix in a side stream of gas, and discharging said gaseous side stream and entrainment into and countercurrent to the downstream flowing kiln gas so that the discharged entrainment travels in an elongated upstream trajectory terminating at an upstream zone in the kiln whereby the entrainment absorbs and thereby recovers heat from said hot kiln gas.

3. In the process wherein essentially dry rock containing materials are calcined and formed into clinker by treatment with hot gas flowing downstream in a kiln, said materials including raw mix that has not been previously kiln treated, the steps that include continuously dumping some of said materials in a downstream zone in the kiln, entraining additional of said materials including said raw mix in a side stream of gas outside the kiln at a lower temperature than the downstream flowing gas in the kiln, and discharging said gaseous side stream and entrainment into the hot gas in a downstream kiln zone so that the discharged entrainment travels in an elongated upstream trajectory terminating at an upstream zone in the kiln whereby the entrainment absorbs and thereby recovers heat from said hot kiln gas.

4. In the process wherein rock containing calcareous materials are calcined and formed into clinker by treatment with hot kiln gas, said materials including raw mix that has not been previously kiln treated, the steps that include continuously dumping some of said materials in a downstream zone in the kiln, entraining additional of said materials including said raw mix in a side stream of gaseous effluence from the kiln, and discharging said gaseous side stream and entrainment into a downstream kiln zone so that the discharged entrainment travels in an elongated upstream trajectory terminating at an upstream zone in the kiln whereby the entrainment absorbs and thereby recovers heat from said hot kiln gas.

5. In the process wherein rock containing calcareous materials are calcined and formed into clinker by treatment with hot kiln gas, said materials including raw mix that has not been previously kiln treated, the steps that include continuously dumping some of said materials in a downstream zone in the kiln, entraining additional of said materials including said raw mix in a side stream of gaseous effluence from the kiln, and dispersing said gaseous side stream and entrainment into the hot gas in a downstream kiln zone so that the dispersed entrainment travels in an elongated upstream trajectory terminating at an upstream zone in the kiln whereby the entrainment absorbs and thereby recovers heat from said hot kiln gas.

6. In the process for producing cement wherein calcareous materials are calcined into clinker by treatment with hot gas flowing in a kiln, said materials including raw mix that has not been previously kiln treated, the steps that include continuously dumping some of said materials in a downstream zone in the kiln, entraining additional of said materials including said raw mix in a side stream of hot gaseous effluence from the kiln, and discharging said gaseous side stream and entrainment into and countercurrent to the downstream flowing kiln gas so that the discharged entrainment travels in an elongated upstream trajectory terminating at an upstream zone in the kiln whereby the entrainment absorbs and thereby recovers heat from said hot kiln gas.

7. In the process for producing cement wherein calcareous materials are calcined and formed into clinker by treatment with hot gas flowing in a kiln, said materials including raw mix that has not been previously kiln treated, the steps that include introducing material fines into the kiln fuel combustion zone to be burned into clinker, continuously dumping some of said materials in a downstream zone in the kiln, entraining additional of said materials including said raw mix in a side stream of gas, and discharging said gaseous side stream and entrainment into the hot kiln gas flowing downstream of said combustion zone in the kiln so that the discharged entrainment travels in an elongated upstream trajectory terminating at an upstream zone in the kiln whereby the entrainment absorbs and thereby recovers heat from said hot kiln gas.

8. In the process for producing cement wherein calcareous materials are calcined and formed into clinker by treatment with hot gas flowing in a kiln, said materials including the primary raw mixture not previously kiln treated and dust recovered from the hot gas, the steps that include continuously dumping some of said materials in a downstream zone in the kiln, entraining additional of said materials including the recovered dust and raw mixture in a side stream of gas, and discharging said gaseous side stream and entrainment into the hot gases flowing downstream within the kiln so that the discharged entrainment travels in an elongated upstream trajectory terminating at an upstream zone in the kiln whereby the entrainment absorbs and thereby recovers heat from said hot kiln gas.

9. The process of claim 8 icluding adjusting the rate of said entrainment discharge in relation to the rate of said dumping so as to reduce the amount of heat energy required to produce a given quantity of clinker below the amount of heat energy required to produce the same quantity of clinker in the absence of said entrainment discharge.

10. The process of claim 8 including adjusting the rate of said entrainment discharge in relation to the rate of said dumping so as to substantially minimize the amount of heat energy required to produce a given quantity of clinker.

11. In the process for producing cement wherein calcareous materials are calcined and formed into clinker by treatment with hot gas flowing downstream in a kiln, said materials including the primary raw mixture not previously kiln treated and dust recovered from the hot gas, the steps that include introducing at least some of the dust into the kiln fuel combustion zone to be burned into clinker, continuously dumping some of said materials in a downstream zone in the kiln, entraining additional of said materials including the recovered dust and the raw mixture in a side stream of said gas outside the kiln, discharging said gaseous side stream and entrainment into the hot kiln gases flowing downstream of said combustion zone so that the discharged entrainment travels in an elongated upstream trajectory terminating at an upstream zone in the kiln whereby the entrainment absorbs and thereby recovers heat from said hot kiln gas.

12. The process of claim 11 including adjusting the relative rates of said entrainment discharge, dust introduction and materials dumping so as to reduce the amount of heat energy required to produce a given quantity of clinker below the amount of heat energy required to produce the same quantity of clinker in the absence of said entrainment discharge and dust introduction.

13. The process of claim 11 including adjusting the relative rates of said entrainment discharge, dust introduction and materials dumping so as to substantially minimize the amount of heat required to produce a given quantity of clinker.

14. In the process for producing cement wherein calcareous materials are calcined and formed into clinker by contact with hot gas flowing downstream in a rotary kiln in countercurrent relation to the materials flow, said materials including the primary raw mixture not previously kiln treated and dust mechanically recovered from the hot gaseous kiln effluence, the steps that include continuously dumping some of said materials in a downstream zone in the kiln, entraining additional of said materials including the recovered dust and the raw mixture in a side stream of said gas outside the kiln at a temperature lower than the kiln gas and from which dust has been recovered, and ejecting said gaseous side stream and entrainment upstream in the kiln into the hotter kiln gases so that the ejected entrainment travels in an elongated upstream trajectory terminating at an upstream zone in the kiln whereby the entrainment absorbs and thereby recovers heat from said hot kiln gas.

15. The process of claim 14 including inducing mixing of said hotter kiln gas with said entrainment in said gaseous stream immediately after ejection thereof.

16. In the process for producing cement wherein calcareous materials are calcined and formed into clinker by contact with hot gas flowing downstream in a rotary kiln in countercurrent relation to the materials flow, said materials including the primary raw mix, not previously kiln treated and dust mechanically recovered and precipitated from the hot gaseous kiln effluence, the steps that include introducing at least some of the precipitated dust into the kiln gas combustion zone to be burned into clinker, continuously dumping some of said materials in a downstream zone in the kiln, entraining additional of said materials including the mechanically recovered dust and the raw mixture in a side stream of said gas outside the kiln at a temperature lower than the kiln gas and from which dust has been recovered, and ejecting said gaseous side stream and entrainment upstream in the kiln into the hotter kiln gases flowing downstream of said combustion zone so that the discharged entrainment travels in an elongated upstream trajectory terminating at an upstream zone in the kiln whereby the entrainment absorbs and thereby recovers heat from said hot kiln gas.

17. Clinker producing means, comprising a kiln, means continuously feeding rock containing materials into a downstream zone in the kiln, said materials including raw mix that has not been previously kiln treated, a supply receptacle for said raw mix outside the kiln, means producing hot gas flowing downstream in the kiln for calcining said materials, separator means outside the kiln for receiving the hot kiln gas and for separating coarse dust therefrom, blower means receiving a side stream of said hot kiln gas from which coarse dust has been separated and for pressurizing said side stream, means supplying other rock containing materials including said raw mix to said side stream to be conveyed thereby, nozzle means discharging said side stream and conveyed materials into the kiln so that the discharged materials travel in an upstream trajectory terminating at an extended length upstream zone in the kiln whereby the discharged materials absorb and thereby recover heat from said hot kiln gas, and conduit means for conducting to the nozzle said side stream of gas and other rock containing materials including said raw mix conveyed in the stream, said conduit means communicating with said blower and nozzle means.

18. The invention as defined in claim 17 in which said means supplying other rock containing materials to said side stream includes a duct communicating with said conduit means downstream of said blower means and a conveyor for feeding said other rock containing materials to said duct.

19. The invention as defined in claim 18 including means communicating with said duct for supplying compressed air thereto to convey said other rock containing material through said duct to said conduit means.

20. The invention as defined in claim 17 including shroud means in the kiln spaced from the nozzle for inducing mixing of hot kiln gas with said other rock containing materials discharged by the nozzle.

References Cited in the file of this patent

UNITED STATES PATENTS

| | | |
|---|---|---|
| 1,496,913 | Warford | June 10, 1924 |
| 1,909,820 | Falla | May 16, 1933 |
| 1,977,767 | Klencke | Oct. 23, 1934 |
| 2,218,873 | Cheesman et al. | Oct. 22, 1940 |
| 2,621,034 | Stecker | Dec. 9, 1952 |
| 2,653,809 | Azbe | Sept. 29, 1953 |
| 2,756,981 | Muller | July 31, 1956 |
| 2,796,249 | Plass | June 18, 1957 |

FOREIGN PATENTS

| | | |
|---|---|---|
| 898,007 | France | June 19, 1944 |
| 1,065,274 | France | May 21, 1954 |